United States Patent
Konrad et al.

(10) Patent No.: US 8,216,728 B2
(45) Date of Patent: Jul. 10, 2012

(54) DEVICE FOR TREATING REACTION GASES IN FUEL CELLS

(75) Inventors: Gerhard Konrad, Ulm (DE); Heiner Kunckel, Heroldstatt (DE)

(73) Assignee: Daimler AG, Stuttgart (DE)

( * ) Notice: Subject to any disclaimer, the term of this patent is extended or adjusted under 35 U.S.C. 154(b) by 97 days.

(21) Appl. No.: 12/523,592

(22) PCT Filed: Jan. 21, 2008

(86) PCT No.: PCT/EP2008/000410
§ 371 (c)(1),
(2), (4) Date: Jul. 17, 2009

(87) PCT Pub. No.: WO2008/089930
PCT Pub. Date: Jul. 31, 2008

(65) Prior Publication Data
US 2010/0009226 A1 Jan. 14, 2010

(30) Foreign Application Priority Data
Jan. 22, 2007 (DE) .................. 10 2007 003 144

(51) Int. Cl.
*H01M 8/04* (2006.01)
(52) U.S. Cl. ........................ 429/415; 429/428
(58) Field of Classification Search .................. 429/415, 429/428, 443, 450, 452, 427
See application file for complete search history.

(56) References Cited

U.S. PATENT DOCUMENTS

| 6,472,091 | B1 | 10/2002 | Konrad | |
|---|---|---|---|---|
| 6,669,177 | B2 | 12/2003 | Shimanuki | |
| 6,887,304 | B2 | 5/2005 | Stroh | |
| 2001/0010875 | A1 | 8/2001 | Katagiri | |
| 2001/0021467 | A1 | 9/2001 | Suzuki | |
| 2005/0247200 | A1 | 11/2005 | Berger | |
| 2007/0122669 | A1* | 5/2007 | Kusano et al. ................. 429/26 |

FOREIGN PATENT DOCUMENTS

| DE | 19548297 A1 | 6/1997 |
|---|---|---|
| DE | 19923738 A1 | 11/2000 |
| DE | 10214078 A1 | 10/2002 |
| DE | 10112863 C1 | 11/2002 |
| DE | 10244707 A1 | 4/2004 |
| DE | 10245202 A1 | 4/2004 |
| DE | 102004022539 B4 | 12/2005 |
| DE | 102004046922 A1 | 3/2006 |
| DE | 112004001832 T5 | 7/2006 |
| JP | 08273687 A | 10/1996 |
| WO | 2004028671 A | 4/2004 |
| WO | 2006034790 A1 | 4/2006 |

* cited by examiner

*Primary Examiner* — Cynthia H. Kelly
*Assistant Examiner* — Monique Wills
(74) *Attorney, Agent, or Firm* — Patent Central LLC; Stephen A. Pendorf

(57) ABSTRACT

The invention relates to devices for operating fuel cells. According to the invention, the two functions "cooling" and "humidification" are combined in a functional unit (10) to adjust the temperature of the air (1) supplied as the reaction medium and to humidify it. Membranes (5) are used that consist of a temperature-resistant material.

8 Claims, 3 Drawing Sheets

DEVICE FOR TREATING REACTION GASES IN FUEL CELLS

The invention relates to a fuel cell system. The invention especially relates to devices for influencing the temperatures and the humidity content of the supplied and discharged reaction gases of a fuel cell.

Fuel cells (BZ) need the observance of a certain region of the operating temperature for an optimal operation. To observe this region, at least one part of the exhaust gas of the fuel cell is returned to the gas inlet according to the document DE 195 48 297 C2, and the temperature of the returned exhaust gas is thereby adjusted. From DE 199 23 738 C2, it is known to feed the cathode of a fuel cell with compressed air. If the air is compressed by means of a compressor, the temperature of the air increases hereby. Thus, in a fuel cell system of this type, the cathode supply air has to be cooled again to a necessary operating temperature region.

Figure 1:
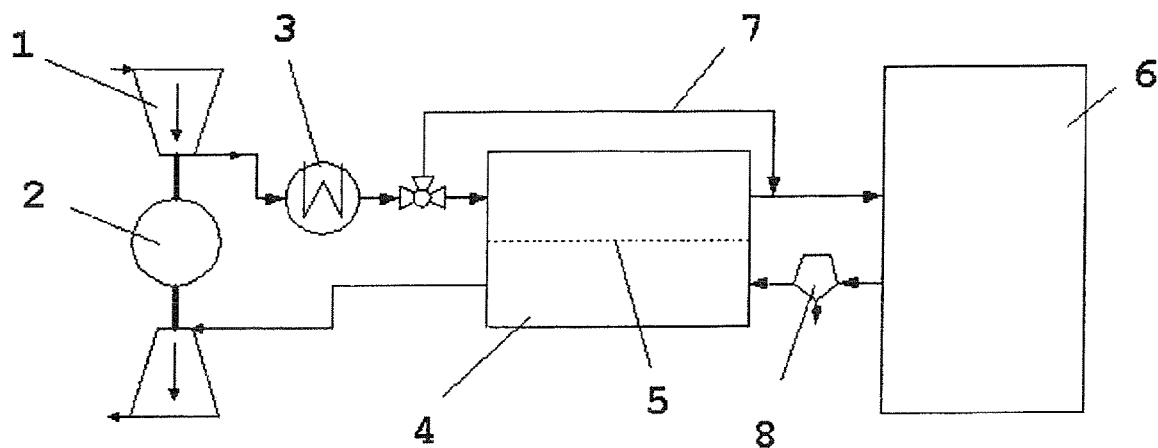

In FIG. 1, the air supply is shown schematically in correspondingly equipped PEMFC systems (proton exchange membrane fuel cell) according to the current state of the art. The inlet air is initially compressed in the compressor (1) and then recooled by means of cooling water in the charge air cooler (3). In the further course, the air flows into the humidifier module (4), where it absorbs water vapor from the exhaust gas of the fuel cell (6) via membranes (5). The humidity content can be controlled with the bypass (7) around the humidifier. The air is then directed into the fuel cell (6) and takes part in the electrochemical reaction. Fluid water which is possibly present is precipitated from the exhaust gas after the reaction in the stack by the condensate precipitator and the remaining exhaust gas is again supplied to the humidifier module (4), where it delivers water vapor to the inlet gas via the membranes. The exhaust gas in the turbine, linked to the compressor via a shaft extending through bearing housing (2), is relaxed after the humidifier module (4) and is discharged to the environment.

The necessity of the cooling water supply of the charge air cooler and the further heat discharge via the vehicle cooler is disadvantageous in this arrangement. The exhaust gas additionally leaves the humidifier (4) in certain operating situations with high relative humidity, which leads to condensate formation in front of or in the turbine and thus to damage of the turbine bearings and turbine blades, and to exhaust plumes.

In the published patent application DE 10 2004 046 922 A1 in the name of the applicant, a modified arrangement for supplying fuel cells is introduced, where the compressed inlet gas is cooled by the exhaust gas of the fuel cell. The temperature of the exhaust gas in front of the turbine increases thereby in a countermove, so that a condensate formation is reduced.

Figure 2:
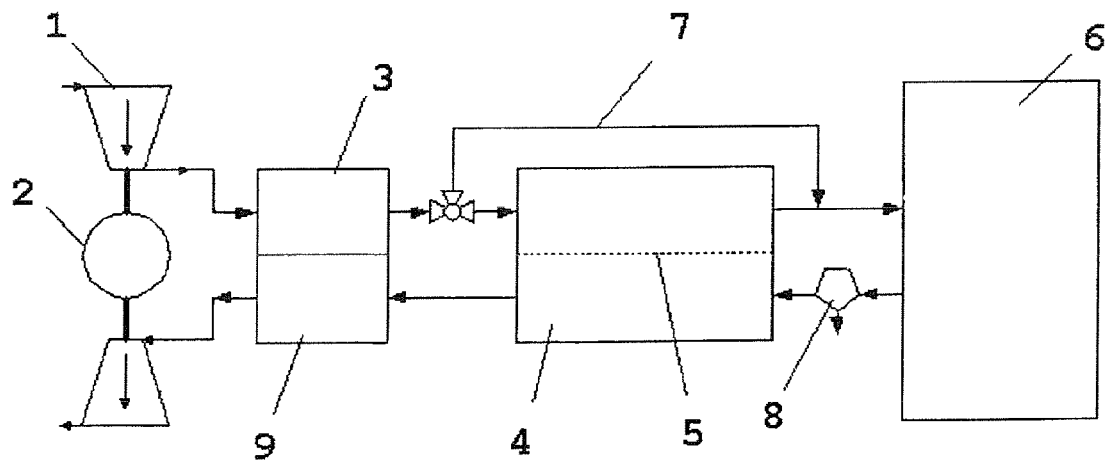

FIG. 2 shows the diagram of such a fuel cell system: after the compressor (1), the inlet air flows through the gas-gas charge air cooler (3) and is precooled there by the BZ exhaust gas by means of heat exchanger (9). Furthermore, the air reaches the humidifier (4) of known design, where it is again humidified by the BZ exhaust gas. It then reaches the BZ stack, takes part in the electrochemical reaction and leaves this again as exhaust gas, which passes the above arrangement in counterflow.

The invention is based on the above-mentioned state of the art. It is based on the object to develop a device for recooling and humidification of the inlet air for fuel cells, which enables a compact construction and efficient control.

This object is solved with a device described in greater detail below.

The invention is explained in more detail in the following by means of examples of embodiments with reference to the drawings and the reference numerals given therein.

It shows thereby:

FIG. 1 the diagram of the current air supply line in the PEMFC system

Figure 3:
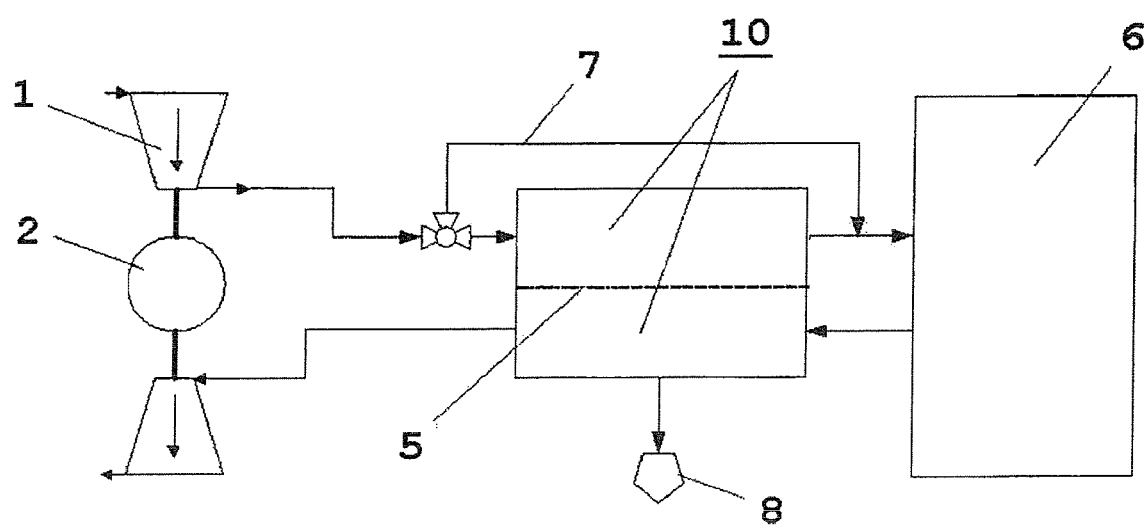
Figure 4:
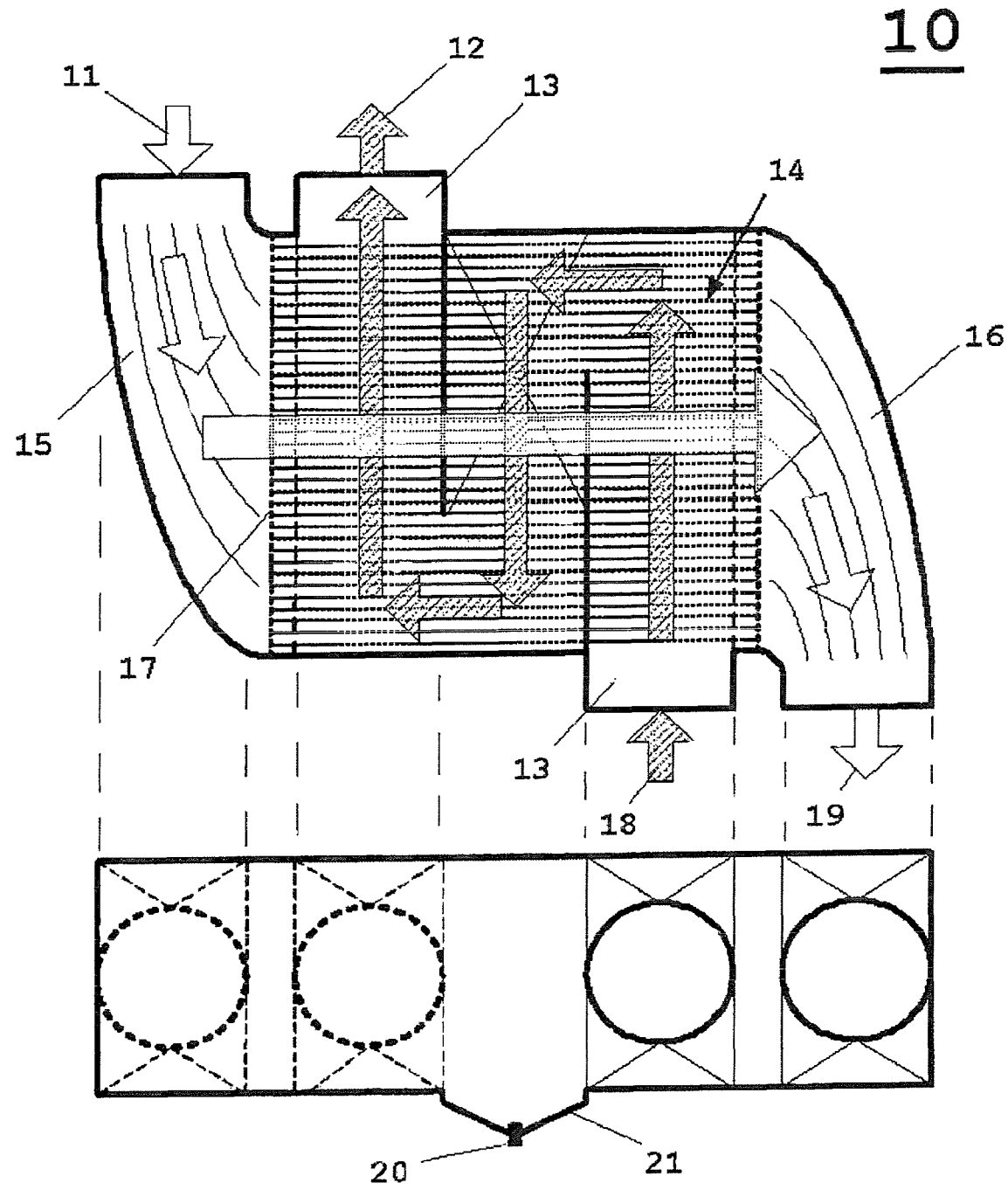

FIG. 2 the diagram of the air supply line with charge air cooling by BZ exhaust gas FIG. 3 the diagram of a combined water vapor and heat exchanger according to the invention FIG. 4 an embodiment of the water vapor and heat exchanger according to the invention The invention suggests to combine the two functions "cooling" and "humidification" in a functional unit, where the known hollow fiber design for membrane humidifiers having a high specific surface can be adopted. These hollow fibers thereby consist of very temperature-resistant membrane material according to the invention, preferably ceramics, and can thereby be used for separating the material flows in the humidifier on the one hand and also release water to the inlet gas. A method for the production of these membranes is for example described in the patent specification DE 101 12 863 C1.

The circuit according to FIG. 3 can be realized by the use of high temperature-resistant membranes, for example of zeolite, silicon oxide, aluminum oxide, or also temperature-stable polymer membranes. Here, the compressed inlet gas is guided directly into the combined humidifier/heat exchanger (10), without first flowing through a water-cooled charge air cooler. Water vapor and heat is simultaneously transferred in the combined unit (10). The inlet gas can partially or completely by guided through the bypass (7) around the humidifier/heat exchanger (10) for controlling the humidity content and the temperature.

By the heat transfer from the inlet gas to the exhaust gas, it is also possible to forgo the condensate precipitator behind the fuel cell stack (6) and instead to guide the fluid water with the exhaust gas directly into the humidifier/heat exchanger (10). The water entering in liquid form evaporates in the humidification section of the combination module (10) and obtains thereby the water vapor partial pressure via the flow path at a high level and the temperature of the exhaust gas at a low level. The material transport and the heat transfer are thereby improved compared to a condensate precipitation before the humidifier. Too much condensate (8) possibly occurring can be discharged via a valve in the base of the humidification section.

FIG. 4 shows an embodiment of the combined heat and material transfer unit according to the invention. A diagram for the functionality for the humidification and cooling of the fuel cell inlet gas is depicted, and for drop precipitation, heating and drying of the fuel cell exhaust gas. The light arrows in this figure represent the flow of the inlet gas, the shaded arrows represent the flow course of the exhaust gas. A side view of the device is shown in the lower part of FIG. 4.

The introduced hot inlet gas (11) first flows through a first flow chamber (15) and is thereby distributed evenly on the front side (17) of a bundle (14) of hollow fiber membranes, preferably of ceramic material, from where it enters the fibers. The separation of the inner space of the fibers from the shell space (13) can for example take place by glueing the fibers at the ends into the fiber bundle carrier in the region of the front side (17). The inlet gas enters a thermal contact with the exhaust gas (18) of the fuel cell when the fibers are flown through, which is guided in the shell space (13). Water vapor is thereby transferred from the exhaust gas through the membrane to the inlet gas. A heat flux flows in the direction of the exhaust gas, which leads to the evaporation of liquid water components in the exhaust gas flow. The humidified and cooled inlet gas (19) is collected in a further flow chamber (16) at the end of the fiber bundle and leaves the humidifier. The introduced exhaust gas (18) itself impinges the fiber bundle (14) transversely in the shell area and is slowed down there. An extensive precipitation of the liquid water components is achieved thereby. The humidity and the temperature of the exhaust gas during the discharge (12) from the humidifier/heat exchanger (10) can be controlled via the condensate forming thereby at the base of the shell area (13). For this, the base of the shell area (13) is slightly lowered in the center region (21) in this embodiment, so that the forming fluid amount can be regulated by means of a valve (20). At the end of the meander-shaped flow through the shell area (13), the exhaust gas is dried by the membranes (14) heated by the hot inlet gas.

The different gas flows can thereby be controlled independently from one another in this functional unit, e.g. by means of control flaps (not shown). The properties of the supply and the exhaust gases can thereby be adjusted to the desired operating conditions of the fuel cell.

By the invention, a combined and structurally compact unit is provided for several functions which previously took place in separate steps and equipments. The charge air cooler can be forgone according to the invention by the use of temperature-stable membranes, for example of ceramic materials or also temperature-resistant polymers. The inlet gas can be directed into the combined humidifier/heat exchanger without pre-cooling, and there can thermally contact the exhaust gas via the membranes. The inlet gas is thereby simultaneously humidified and cooled, and the exhaust gas is dried and heated in the counterflow. A separate condensate precipitator behind the fuel cell can further be forgone with a corresponding embodiment, and the liquid water can instead be evaporated in the exhaust gas flow in the exchanger unit (10) according to the invention with the energy now available from the inlet gas. Water which cannot be evaporated can be discharged in a specific manner, e.g. via a base discharge in the humidifier space. The invention enables the processes heat transfer, water transport and drop precipitation in a space-saving manner in one functional unit. The water-supplied charge air cooler behind the compressor and the drop precipitator behind the fuel cell can thereby be omitted, and the waste heat of the inlet gas cooling also does not have to be discharged via the vehicle cooler. The exhaust gas is heated prior to entering the turbine, whereby the condensation water formation and the exhaust plume formation is avoided in this critical region. A higher enthalpy decline is thereby available in the turbine, whereby the turbine performance is increased. The manufacturing effort for a fuel cell system is generally reduced by the combination of different functions in one device.

The invention claimed is:

1. A device (10) for a fuel cell system for controlling the temperature and humidity content of the inlet air supplied via a compressor (1) and the reaction gases as exhaust gas (18) discharged from the fuel cell (6),
    wherein the compressor (1) compresses inlet air to temperature above the operating temperature region of the fuel cell system,
    wherein exhaust gas (18) of the fuel cell (6) is used for cooling and humidifying the compressed inlet air (11) by refeed via membranes (5),
    wherein membrane bundles (14) are mounted in a functional unit (10) for cooling and humidification,
    wherein the membranes of the membrane bundle (14) consist of high temperature-resistant material,
    wherein the functional unit (10) has flow chambers (15, 16) on the one hand, via which the compressed inlet air (11) in contact with the membrane bundle (14) is guided in the direction of the fuel cell (6), and on the other hand a shell volume (13) through which the exhaust gas (18) of the fuel cell (6) is guided in a counterflow through the functional unit (10) via the membrane bundle (14), and
    wherein the functional unit (10) has means (20, 21) for controlling condensate in the shell volume (13).

2. The device according to claim 1, wherein the membranes of the membrane bundle (14) are formed as hollow fiber membranes.

3. The device according to claim 1, wherein the shell volume (13) is divided in such a manner that the exhaust gas (18) of the fuel cell (6) is guided over the membrane bundle (14) in a meandering manner.

4. The device according to claim 1, wherein means for regulating the gas flows are present.

5. The device according to claim 1, wherein the membranes of the membrane bundle (14) consist of high temperature-resistant ceramics.

6. The device according to claim 4, wherein a bypass (7) is provided as means for regulating the gas flows.

7. The device according to claim 1, wherein the membranes of the membrane bundle (14) consist of zeolite, silicon oxide, aluminum oxide, or temperature-stable high temperature-resistant polymer membranes.

8. A device (10) for a fuel cell system for controlling the temperature and humidity content of the inlet air supplied via a compressor (1) and the reaction gases as exhaust gas (18) discharged from the fuel cell (6),
    wherein the compressor (1) compresses inlet air to temperature above the operating temperature region of the fuel cell system,
    wherein exhaust gas (18) of the fuel cell (6) is used for cooling and humidifying the compressed inlet air (11) by refeed via membranes (5),
    wherein membrane bundles (14) are mounted in a functional unit (10) for cooling and humidification,
    wherein the functional unit (10) has flow chambers (15, 16) on the one hand, via which the compressed inlet air (11) in contact with the membrane bundle (14) is guided in the direction of the fuel cell (6), and on the other hand a shell volume (13) through which the exhaust gas (18) of the fuel cell (6) is guided in a counterflow through the functional unit (10) via the membrane bundle (14), and
    wherein the functional unit (10) has means (20, 21) for controlling condensate in the shell volume (13), and
    further comprising a turbine driven by exhaust gas, which turbine drives the compressor (1).

* * * * *